United States Patent
Cangiani et al.

(10) Patent No.: US 7,154,962 B2
(45) Date of Patent: Dec. 26, 2006

(54) METHODS AND APPARATUS FOR GENERATING A CONSTANT-ENVELOPE COMPOSITE TRANSMISSION SIGNAL

(75) Inventors: Gene L. Cangiani, Parsippany, NJ (US); Richard S. Orr, Montgomery Village, MD (US); Charles Q. Nguyen, Parsippany, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 804 days.

(21) Appl. No.: 09/963,669

(22) Filed: Sep. 27, 2001

(65) Prior Publication Data

US 2002/0075907 A1 Jun. 20, 2002

Related U.S. Application Data

(60) Provisional application No. 60/235,576, filed on Sep. 27, 2000, provisional application No. 60/253,410, filed on Nov. 28, 2000.

(51) Int. Cl.
*H04L 27/04* (2006.01)
(52) U.S. Cl. ............... 375/295; 375/298; 375/308; 375/346; 342/375; 455/126
(58) Field of Classification Search ............ 375/135, 375/146, 260, 267, 278, 295, 299, 308–309; 370/320, 324, 441; 455/17, 23, 101, 102, 455/103
See application file for complete search history.

(56) References Cited

U.S. PATENT DOCUMENTS 6,044,071 A * 3/2000 Spilker, Jr. ............... 370/320
6,335,951 B1 1/2002 Cangiani et al.

FOREIGN PATENT DOCUMENTS

WO WO 00 13343 A 3/2000
WO WO 01 08326 A 2/2001

OTHER PUBLICATIONS

S.Butman et al., "Interplex- An Efficient Multichannel PSK/PM Telemetry System", IEEE Transactions on Communication, Jun. 1972.

(Continued)

*Primary Examiner*—Jean B. Corrielus
*Assistant Examiner*—Edith Chang
(74) *Attorney, Agent, or Firm*—Edell, Shapiro & Finnan, LLC

(57) ABSTRACT

An intervote modulator (10) includes a majority voting logic unit (12) and an interplex modulator (14). The majority voting logic unit receives plural signal codes (e.g., five codes $x_1, x_2, x_3, x_4, x_5$) together with their respective target gains $G_1, G_2, G_3, G_4, G_5$ representing the desired transmit power for the individual signal codes. The majority voting logic unit combines three of these five signal codes to form a majority vote composite signal while keeping the other two signal codes uncombined. The majority vote composite signal and the two uncombined signals are then supplied to the interplex modulator as signals $s_1$, $s_2$ and $s_3$. The interplex modulator applies interplex modulation to signals $s_1$, $s_2$ and $s_3$ to form the in-phase and quadrature components of the final composite signal. The majority voting logic unit employs a generalized majority vote involving an interlace of sub-majority votes determined on a chip-by-chip basis.

40 Claims, 6 Drawing Sheets

OTHER PUBLICATIONS

J. Spilker et al., "Code Multiplexing via Majority Logic for GPS Modernization" Proceedings of the Institute of Navigation (ION) GPS—98, Sep. 15-18, 1998.

Spilker, "Digital Communications by Satellite", pp. 600-603, Prentice-Hall, Inc., 1977.

Claude E. Shannon et al., "A Mathematical Theory of Communication" pp. 32-125, The University of Illinois Press, 1964.

Easterling, M.F., "A Skin-Tracking Radar Experiment Involving the COURIER Satellite", IRE Trans. SET, pp. 76-84, Jun. 1962.

* cited by examiner

METHODS AND APPARATUS FOR GENERATING A CONSTANT-ENVELOPE COMPOSITE TRANSMISSION SIGNAL

CROSS-REFERENCE TO RELATED APPLICATIONS

This application claims priority from U.S. Provisional Patent Application Ser. No. 60/235,576, entitled "Intervote Modulation—A Very Efficient Signal Combining Technique," filed Sep. 27, 2000 and from U.S. Provisional Patent Application Ser. No. 60/253,410, entitled "Intervote Modulation—A Very Efficient Signal Combining Technique," filed Nov. 28, 2000. The disclosures of these provisional patent applications are incorporated herein by reference in their entireties.

BACKGROUND OF THE INVENTION

1. Field of Invention

The present invention relates to a method and apparatus for generating a constant-envelope composite transmission signal and, more particularly, to techniques for efficiently combining more than three information signals into a composite, constant-envelope signal using a combination of majority voting logic and interplex modulation schemes.

2. Description of the Related Art

Combining multiple signals on the same radio frequency (RF) carrier is often desirable in both one-way and two-way communications systems, and the importance of signal combining techniques will grow as RF communications systems continue to proliferate and RF spectrum becomes increasingly crowded. Existing methods of signal combining include techniques that generate composite signals whose instantaneous power varies with time (non-constant-envelope signals), such as linear signal combination. Other existing techniques, such as conventional phase shift keyed/phase modulated (PSK/PM) systems, generate constant-envelope composite signals.

Linear methods that generate non-constant-envelope composite signals result in power-inefficient mechanizations, because the power amplifiers that are used for transmission of the composite signals must operate in the linear region. Power amplifiers are much more efficient when operated in the saturated mode. Therefore, constant-envelope signal structures are required if full-power, undistorted transmission is sought.

For example, in a CDMA cellular telephone system, linear superposition of chip-synchronous, orthogonal signals to be transmitted from a base station is a theoretically lossless multiplex if the subsequent transmission chain remains linear. Maintaining linearity requires a linear high power amplifier (HPA). Since any HPA characteristic eventually saturates as its input power increases, such base station transceiver linear amplifiers are typically run at 4–5 dB average power backoff to accommodate peak power needs. In addition, the rather severe spectral containment filtering applied to each user signal before multiplexing creates amplitude fluctuations of 4–5 dB peak-to-average power, requiring additional backoff. Consequently, total backoff can easily be 9 or 10 dB in this particular context.

Thus, linear combination techniques are maximally efficient in the sense that there is no actual signal power loss, but the overall efficiency of such techniques is compromised by the need to operate the amplifier at a significant power back-off to accommodate the instantaneous signal envelope fluctuations. Further, conventional PSK/PM systems have limited power efficiency, because PSK/PM systems include unmodulated carrier and cross modulation terms, which represent wasted power.

An alternative approach to producing greater average power is to achieve a more effective allocation of the loss budget between the multiplexer and the high power amplifier. Applied to orthogonal waveforms, non-linear multiplex methods that produce a constant-envelope composite signal permit a greater fraction of the available transmitter power to be used for communication, but at the expense of a multiplexing loss that may be characterized as either crosstalk (induced non-orthogonality or harmonic distortion) or receiver cross-correlation mismatch. This multiplexing loss, however, is typically smaller than the power backoff it replaces, resulting in a favorable trade.

Constant-envelope composite signals would be particularly beneficial in a number of presently evolving systems. For example, the Global Positioning System (GPS) is an application in which constant-envelope composite signals would be beneficial. This system includes a constellation of Earth-orbiting satellites that transmit signals useful for determining position. By measuring the time delay in broadcasted signals received from several of these satellites, a receiver can determine its own position using trilateration. Continually evolving GPS system requirements necessitate the simultaneous transmission of multiple signals from each of the GPS satellites, making constant-envelope signals of great interest in developing future GPS signal structures and system architectures.

Under GPS modernization programs, the U.S. government is studying techniques to enhance both the military and civilian utility of GPS. A possible outcome of this effort is the inclusion of three or four distinct PN codes in the signal transmitted by a satellite at one frequency. As military and civilian requirements for GPS change over time, operational modifications will continue to be necessary. Critical signaling parameters, such as chip rates, code types, fixed carrier offset, hopping sequences for hopped carrier offset, and relative power ratios, may require modification throughout the operational life of a satellite. In addition to having the capability to produce constant-envelope composite signals, the waveform generator onboard each GPS satellite must be remotely reprogrammable to support generation of a variety of possible future signaling waveforms.

Code division multiple access (CDMA) based cellular telephony and data networks are among other applications for which constant-envelope composite signals would be useful. CDMA transmission of voice/data in terrestrial cellular networks places more stringent requirements on CDMA than any prior applications. Traffic is two-way, and the number of codes per cell can presently be as many as sixty-four and may increase to 128 in the future. Code channels have various functions: pilot, paging, synchronization, control, and traffic. To avoid the dominance of one or a few signals (the "near-far" problem), power control is required at both the subscriber and base station terminals. Because the user mix continually varies due to newly initiated and recently completed calls, user motion and cell-to-cell handoffs, power control is dynamic and rapid (on the scale of milliseconds). Difficult channel conditions are posed by multipath interference and signal obstruction in urban environments. Data rates and traffic loads are certain to increase far beyond present levels. Security of data flowing through the network is needed for operations, maintenance, accurate billing and privacy. Although the primary function of the system is data transmission, there are a variety of reasons, e.g. E911, why determination of subscriber position will be a required, integrated function for all future mobile networks. This complex environment presents an unprecedented need to multiplex CDMA signals efficiently into a constant-envelope signal.

Interplex Modulation and Majority Voting Logic are two techniques that have recently gained consideration for generating constant-envelope, phase modulated composite signals that offer improved efficiency over standard PSK/PM systems. The concept of Interplex Modulation is described by S. Butman et al, in "Interplex—An Efficient Multichannel PSK/PM Telemetry System," IEEE Transactions on Communications, June 1972, incorporated herein by reference in its entirety. The use of Majority Voting to combine signals is described by J. Spilker et al. in "Code Multiplexing via Majority Logic for GPS Modernization", Proceedings of the Institute of Navigation (ION) GPS—98, Sept. 15–18, 1998 and by Spilker in "Digital Communications by Satellite", pp. 600–603, Prentice-Hall, Inc., 1977, both incorporated herein by reference in their entireties.

The composite signal formed by interplex modulation has a constant envelope, i.e., its instantaneous power level does not change with time. Using quadrature carriers, interplex modulation can combine any number of data-bearing, PN spread binary codes and offers a significant improvement in power efficiency over PSK/PM. The component signals may have any assigned power distribution. However, depending upon the desired power ratios among the signal components, the resultant efficiency of Interplex Modulation can degrade rapidly as the number of signals in the mix is increased. Interplex modulation is quite efficient in representing three components (efficiency is never less than 75% for any power allocation), but its efficiency drops rapidly as more signals are added, and is generally not useful for more than five components.

Majority Voting was conceived as a technique to combine multiple signals onto a single RF quadrature component, but has been adapted successfully to general RF modulation. It too represents a significant improvement over PSK/PM and is convenient for large numbers of component signals, but the resultant efficiency can be substantially reduced for scenarios that require relatively large differences in power levels among the various signal components.

Accordingly, there remains a need for a system capable of more efficiently combining signals into a constant-envelope composite signal, particularly where the signals have significantly different power levels or the number of signals to be combined exceeds three.

SUMMARY OF THE INVENTION

Therefore, in light of the above, and for other reasons that become apparent when the invention is fully described, an object of the present invention is to efficiently generate constant-envelope signals to allow use of saturated high power amplifiers in signal transmission.

Another object of the present invention is to overcome the efficiency problems experienced with interplex modulation when combining greater numbers of signals into a constant-envelope composite signal.

A further object of the present invention is to overcome the efficiency problems experienced with majority voting when combining signals with certain power ratios into a constant-envelope composite signal.

Still another object of the present invention is to more efficiently combine several signals into a constant-envelope composite signal by adapting majority voting and interplex modulation techniques for use in tandem.

Yet a further object of the present invention is to generate constant-envelope composite signals using a programmable waveform generator that is remotely reprogrammable in the field to adjust for changing system requirements and operational parameters.

A still further object of the present invention is to generate constant-envelope composite signals useful in satellite communication and navigation systems (e.g., GPS), mobile communication systems, including wireless telephony, and systems employing spread spectrum signals or CDMA.

The aforesaid objects are achieved individually and in combination, and it is not intended that the present invention be construed as requiring two or more of the objects to be combined unless expressly required by the claims attached hereto.

The present invention utilizes a unique signal architecture wherein the constant-envelope composite signal is generated using a combination of majority voting and interplex modulation techniques. The term "Intervote Modulation" has been coined by the inventors to refer to the technique of the present invention, wherein majority voting and interplex modulation are used in tandem to combine the signal components in two stages. For combining several (e.g., four or more) component signals with virtually any combination of desired power ratios among the signal components, the intervote modulation technique of the present invention can be optimized to achieve improved power efficiency, as compared to utilizing either constituent technique, interplex modulation or majority voting, alone.

For any number of component signals, there are various ways to configure the intervote combination, and the number of possibilities increases with increasing numbers of component signals. To illustrate the operation of intervote modulation, the technique is applied to the combination of five signals. For a given set of power ratios among the five signal components, the system is configured to form the majority vote of three of the signals and then supply the composite, majority-voted signal along with the two remaining individual signal components to a three-signal interplex modulator. The interplex modulator then combines these three signals by placing a linear combination of two of the signals on one RF quadrature component and places on the other quadrature component a linear combination of the third signal and an intentionally introduced intermodulation term. Attenuation coefficients are applied to the carrier component signals to achieve both a target gain distribution and assure constant envelope transmission. The three signals selected for majority vote may be, for example, the three lowest-powered signals. However, this choice, as well as the choice of which interplex modulation component to allocate to the majority vote, can be optimized for maximum efficiency through calculations as described hereinbelow.

For a typical set of desired power ratios among five signals, the intervote combination achieves a power efficiency of 72% as compared to 56% for interplex modulation alone, and 55% for majority vote alone. This efficiency represents a significant improvement in power efficiency (more that 1 dB), and even more dramatic improvement results with greater numbers of signals.

Intervote modulation offers a variety of alternatives for more efficiently combining a greater number of signals and signals requiring disparate power levels. In general, the system of the present invention is implemented with a baseline interplex modulation system configured for some number of signals (fewer that the target number of signals to be combined), and a majority voting logic unit selectively assigns either individual signals or majority-voted combinations to the interplex components. Any odd number of signals may be majority voted, and even numbers of signals may be accommodated by a weighted vote. Additional degrees of freedom arise in using an interlace technique in which the signal actually assigned as the intervote component may be a time-varying combination of various input signals, each combination appearing with a specified relative frequency, as described in greater detail hereinbelow. Intervote modulation inherits from interplex modulation and majority voting the property that all signals in the combination are represented at a common efficiency. That is, the power inefficiency introduced by combining the component signals is distributed proportionally over the component signals, such that each signal is degraded substantially equally. There is no counterpart to effects such as "small signal suppression" routinely found in other non-linear combination methods. Judicious application of this suite of techniques makes intervote modulation highly efficient for the great majority of target power distributions. For certain cases, it can be demonstrated mathematically that intervote modulation is the most efficient constant-envelope combination technique.

The intervote modulator of the present invention can be implemented in a programmable waveform generator that is remotely reprogrammable, such that the majority voting logic scheme and interplex modulation parameters can be modified in the field to accommodate system requirements that change over the lifetime of the communication equipment. The constant-envelope composite signals generated by the intervote modulation techniques of the present invention are useful in a wide variety of systems including, but not limited to, satellite communication and navigation systems (e.g., GPS), mobile communication systems, including wireless telephony, and systems employing spread spectrum signals or CDMA.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
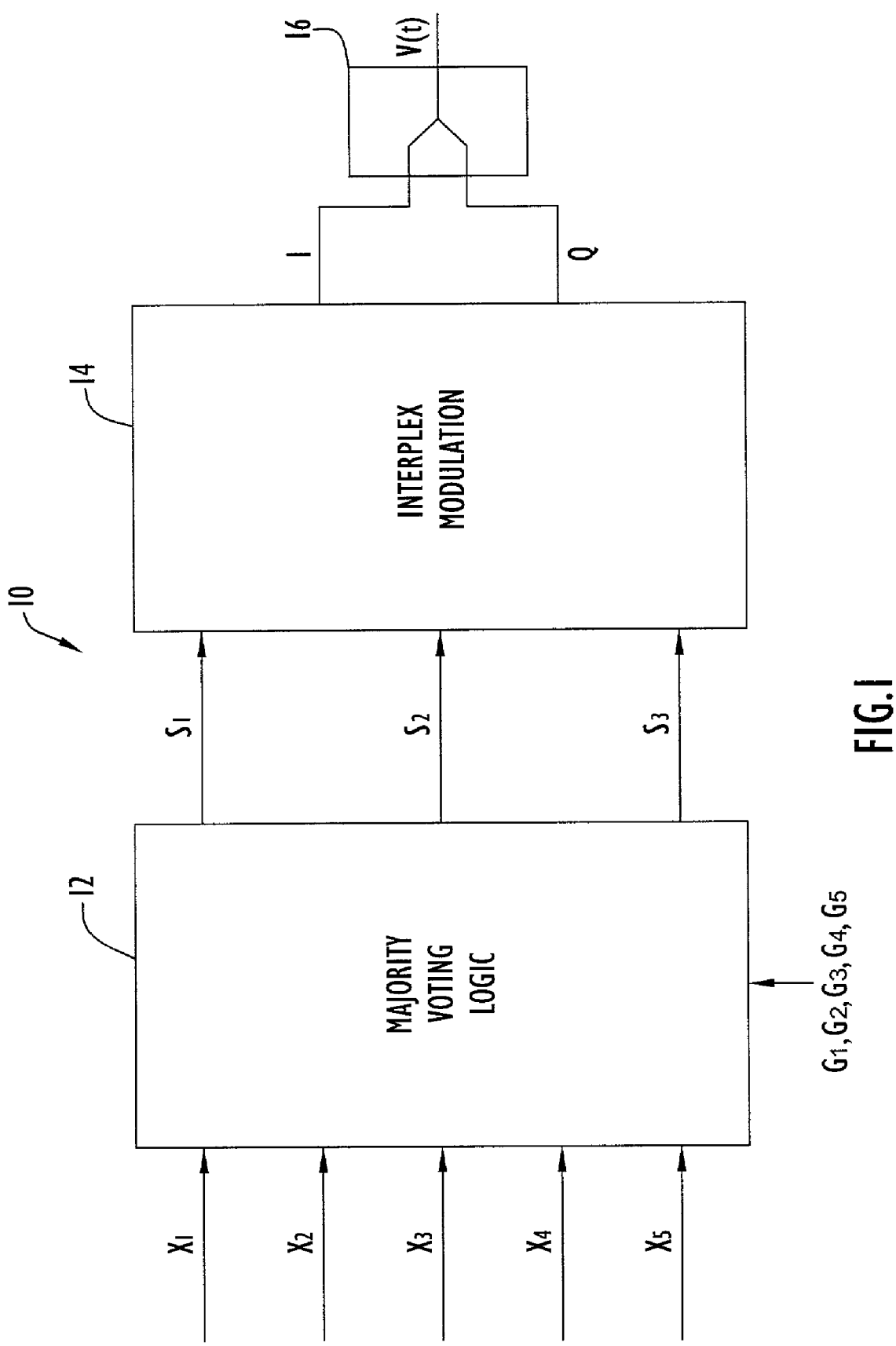
FIG. 1 is a diagrammatic block diagram of an intervote modulator in accordance with an exemplary embodiment of the present invention.
Figure 2:
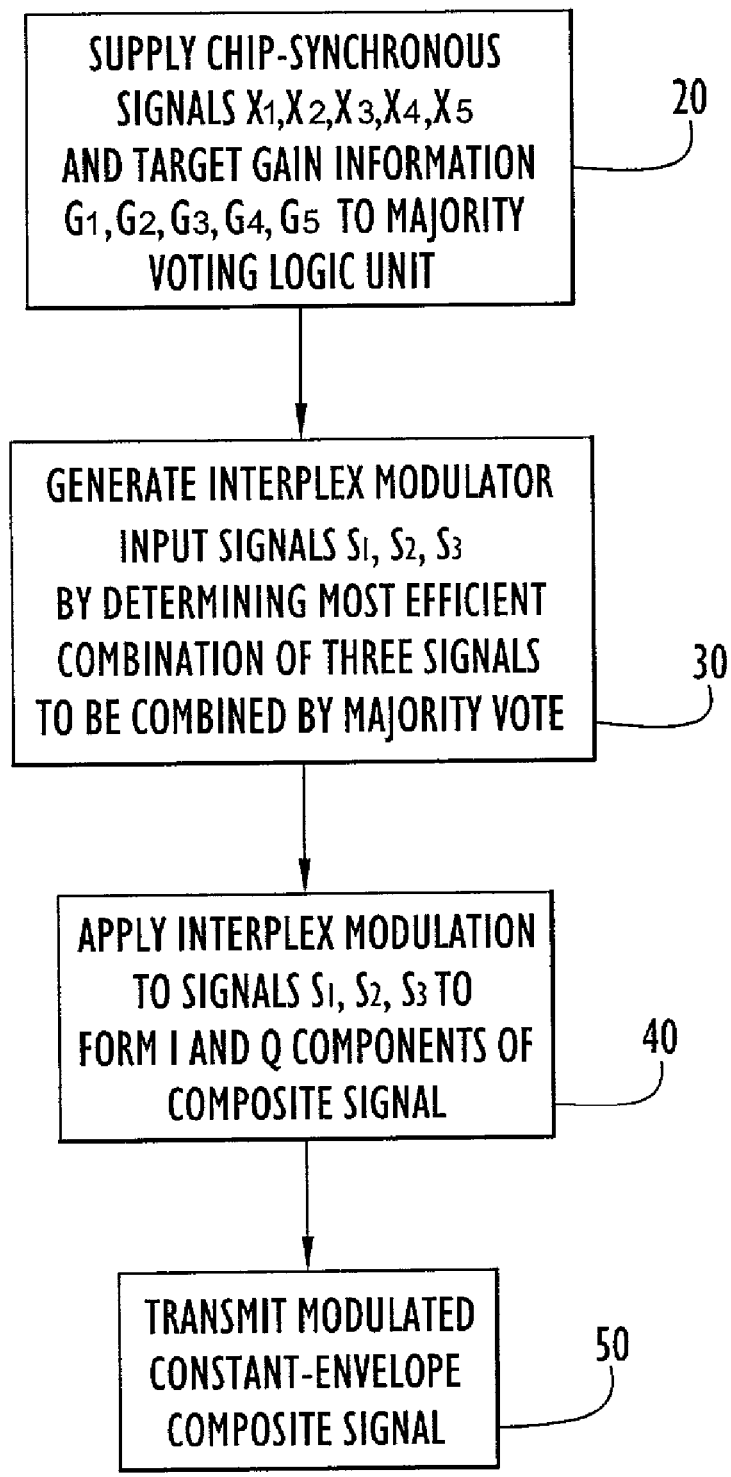
FIG. 2 is a top-level functional flow diagram of the operations performed by the intervote modulator of the exemplary embodiment.

The following detailed explanation of the figures and of the preferred embodiments of the present invention reveal methods and apparatus of efficiently generating a constant-envelope composite transmission signal. A diagrammatic illustration and corresponding flow diagram of an exemplary embodiment of the intervote modulation scheme of the present invention are respectively shown in FIG. 1 and 2. Referring to FIG. 1, the intervote modulator 10 of the present invention includes a majority voting logic unit 12 and an interplex modulator 14. As indicated in step 20 in FIG. 2, the majority voting logic unit 12 receives five signal codes $x_1$, $x_2$, $x_3$, $x_4$, $x_5$ together with their respective target gains $\{G_1, G_2, G_3, G_4, G_5\}$ representing the desired transmit power for the individual signal codes.

As indicated in step 30, the majority voting logic unit 12 combines three of these five signal codes to form a majority vote composite signal while keeping the other two signal codes uncombined. The majority vote composite signal and the two uncombined signals are then supplied to the interplex modulator 14 as signals $s_1$, $s_2$ and $s_3$. As indicated in step 40, the interplex modulator applies interplex modulation to the signals $s_1$, $s_2$ and $s_3$ to form the in-phase (I) and quadrature (Q) components of the final composite signal. The I and Q component signals are supplied to a signal combiner 16 and combined to form the output RF signal V(t) (i.e., the modulated constant-envelope composite signal) for transmission (step 50). While the exemplary embodiment combines a total of five signal codes and interplex modulates three signals, it will be understood that the invention is not limited any particular number of signals, and the invention encompasses combining any practical number of signals, including any practical number of total input signal codes and any practical number of interplex modulator inputs, limited only by equipment constraints and acceptable power efficiency levels.

By way of non-limiting example, the intervote modulation system of the present invention can be employed in a CDMA communication system transmitting multiple CDMA signals to a single location or to a group of spatially dispersed users. These signals employ binary phase-shift keying (BPSK) or quadrature phase-shift keying (QPSK), direct sequence (DS) spread spectrum modulation and have a common chip rate and carrier frequency. The timing of the transmissions being under control of the transmitter, the multiple CDMA signals are chip-synchronous. For example, the invention can be used in conjunction with the system described in U.S. patent application Ser. No. 09/618,102 entitled "Chip-Synchronous CDMA Multiplexer and Method Resulting in Constant Envelope Signals," filed Jul. 17, 2000, the disclosure of which is incorporated herein by reference in its entirety.

For reasons of power control, a power weighting, or fraction of the available transmit power, is periodically assigned to each CDMA signal. That is, the system may frequently assess the channel conditions, such as interference, multipath and range, between the transmitter and each receiving user in order to adjust the transmit power required to transmit signals to each user. This power distribution assignment, represented by the respective target gains $G_1$, $G_2$, $G_3$, $G_4$, $G_5$, remains in effect for a period of time equal to a large number of spread spectrum chips. This power distribution is provided to the majority voting logic unit 14 which uses this information to generate the interplex modulator input signals $s_1$, $s_2$ and $s_3$ in an efficient manner.

During each interval of constant power distribution (i.e., the time period during which the target gains are fixed at particular levels), the majority voting logic receives as input a sequence of chips to be transmitted for each of the five signal codes $x_1$, $x_2$, $x_3$, $x_4$, $x_5$. These chips are represented as binary digital data to be applied to the in-phase (I) and quadrature (Q) transmission channels of the RF signal to be transmitted. The values of data signals $x_1$, $x_2$, $x_3$, $x_4$, $x_5$ fluctuate at the chip rate. The chip rates are the rate of the digital codes, used for example in the GPS system and in CDMA cellular phone systems, and can be on the order of 10 Mbps and higher. Accordingly, based on the commanded power distribution, the majority voting logic must determine which of the signals are to be combined via majority vote, and must apply majority voting logic on a chip-by-chip basis to those signals to produce a composite signal that is supplied to the interplex modulator along with the two remaining individual signals. The interplex modulator then forms I and Q chips from the majority vote composite signal and the two individual signals, which are transmitted in a single direct sequence spread spectrum signal representing the multiple input CDMA signals. The interplex modulator ensures that the total instantaneous power, represented by $I^2+Q^2$, remains constant for all chip intervals. The interplex modulator may do so by keeping $I^2$ and $Q^2$ individually constant, or by controlling their sum, depending on the desired nature of the signal to be transmitted. In either case, the baseband DS spread spectrum signal produced by the intervote modulator has a constant envelope.

Figure 3:
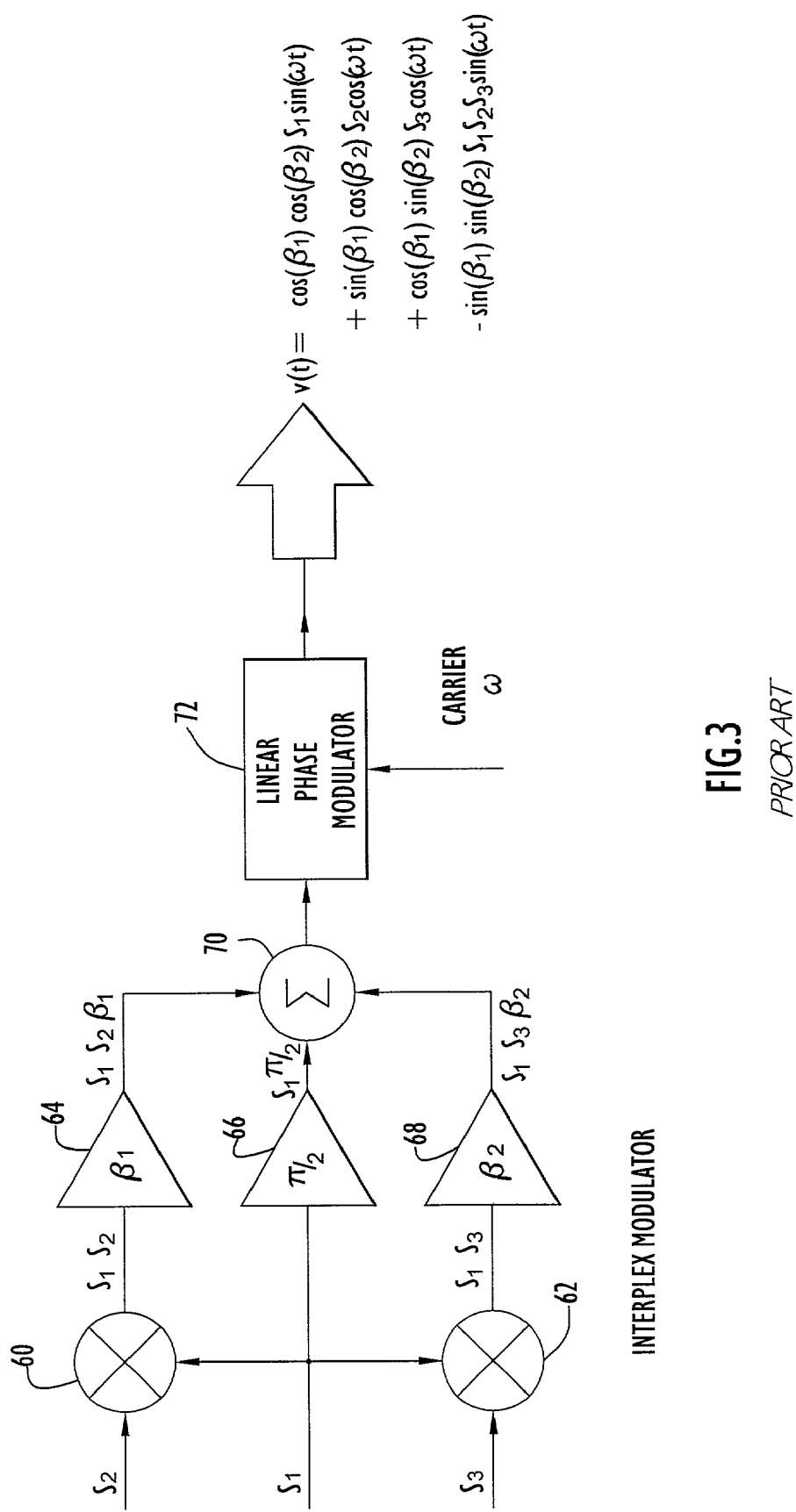
FIG. 3 is a diagrammatic illustration of a conventional approach to interplex modulation.

FIG. 3 is a schematic representation illustrating conceptually an interplex modulator which combines three signals to form a constant-envelope composite signal. Input signals $s_1$, $s_2$ and $s_3$ are digital bitstreams of logical ones and zeros. In FIG. 3, the input signals are shown in "analog" representation, meaning the signals assume the values of –1 and +1, corresponding to the logic values 1 and 0, respectively. Analog multipliers 60 and 62 perform analog multiplications of $s_1$ times $s_2$ and $s_1$, times $s_3$, respectively. Analog gain element 64 places a gain of $\beta_1$ on the product $s_1s_2$, analog gain element 66 places a gain of $\pi/2$ on $s_1$, and analog gain element 68 places a gain of $\beta_2$ on the product $s_1s_3$. An analog summer 70 sums the outputs of the analog gain elements and supplies the sum to a linear phase modulator 72. Linear phase modulator 72 also receives a Sin($\omega t$) carrier signal and modulates the sum signal with the carrier signal to produce the composite constant-envelope output signal v(t) for transmission. The phase modulator has a gain of 1 radian per unit input; therefore, the output from the phase modulator from a unit input has a one radian phase deviation of the Sin(cot) carrier. Accordingly, the output of the phase modulator is:

$$v(t)=\mathrm{Sin}(\omega t+S_1S_2\beta_1+S_1\pi/2+S_1S_3\beta_2) \quad (1)$$

From interplex modulation theory, it is known that the output transmission signal v(t) given by equation (1) can be equivalently expressed as:

$$v(t)=S_1\mathrm{Cos}(\beta_1)\mathrm{Cos}(\beta_2)\mathrm{Sin}(\omega t)+S_2\mathrm{Sin}(\beta_1)\mathrm{Cos}(\beta_2)\mathrm{Cos}(\omega t)+\\ S_3\mathrm{CoS}(\beta_1)\mathrm{Sin}(\beta_2)\mathrm{Cos}(\omega t)-S_1S_2S_3\mathrm{Sin}(\beta_1)\mathrm{Sin}(\beta_2)\mathrm{Sin}(\omega t) \quad (2)$$

where $0 \leq \beta_1 \leq \pi/2$ radians and $0 \leq \beta_2 \leq \pi/2$ radians and therefore $\mathrm{Sin}(\beta_1)$, $\mathrm{Sin}(\beta_2)$, $\mathrm{Cos}(\beta_1)$, and $\mathrm{Cos}(B_2) \geq 0$, such that the computed signal attenuations are never negative.

The resulting modulator output signal v(t) has a constant envelope; thus, a saturated amplifier can be used to transmit this signal without backoff. The first three terms in equation (2) correspond to the desired signal terms $s_1$, $s_2$ and $s_3$, respectively. The fourth term is an intermodulation product, which is an undesired term generated by the modulator. Although the intermodulation product consumes some of the available power, the intermodulation product serves to keep the amplitude of the composite signal envelope constant, which in turn facilitates use of saturated amplifiers.

While conceptually useful, the conventional interplex modulation scheme shown in FIG. 3 suffers from a variety of limitations. The architecture of conventional waveform generators dictates generating the entire composite signaling waveform as a baseband signal and then up-converting the composite baseband signal to the broadcast radio frequency. While this architecture can be used in certain communication systems, such an approach is not suitable for microwave systems, such as GPS, because the baseband frequency is too low to preclude harmonic and intermodulation interference with the desired microwave output. Moreover, time jitter in required digital-to-analog converters adds phase noise onto the desired output signal. Further, in the up-conversion process, the bandpass filters required for each mixing stage produce ringing at phase transitions that generate amplitude envelope variations, which interfere with the efficiency of the saturated high-power amplifiers required for low-power consumption. A result of this non-constant-envelope is signal distortion that adversely impact Bit Error Rate in CDMA systems and navigation accuracy in GPS applications.

Figure 4:
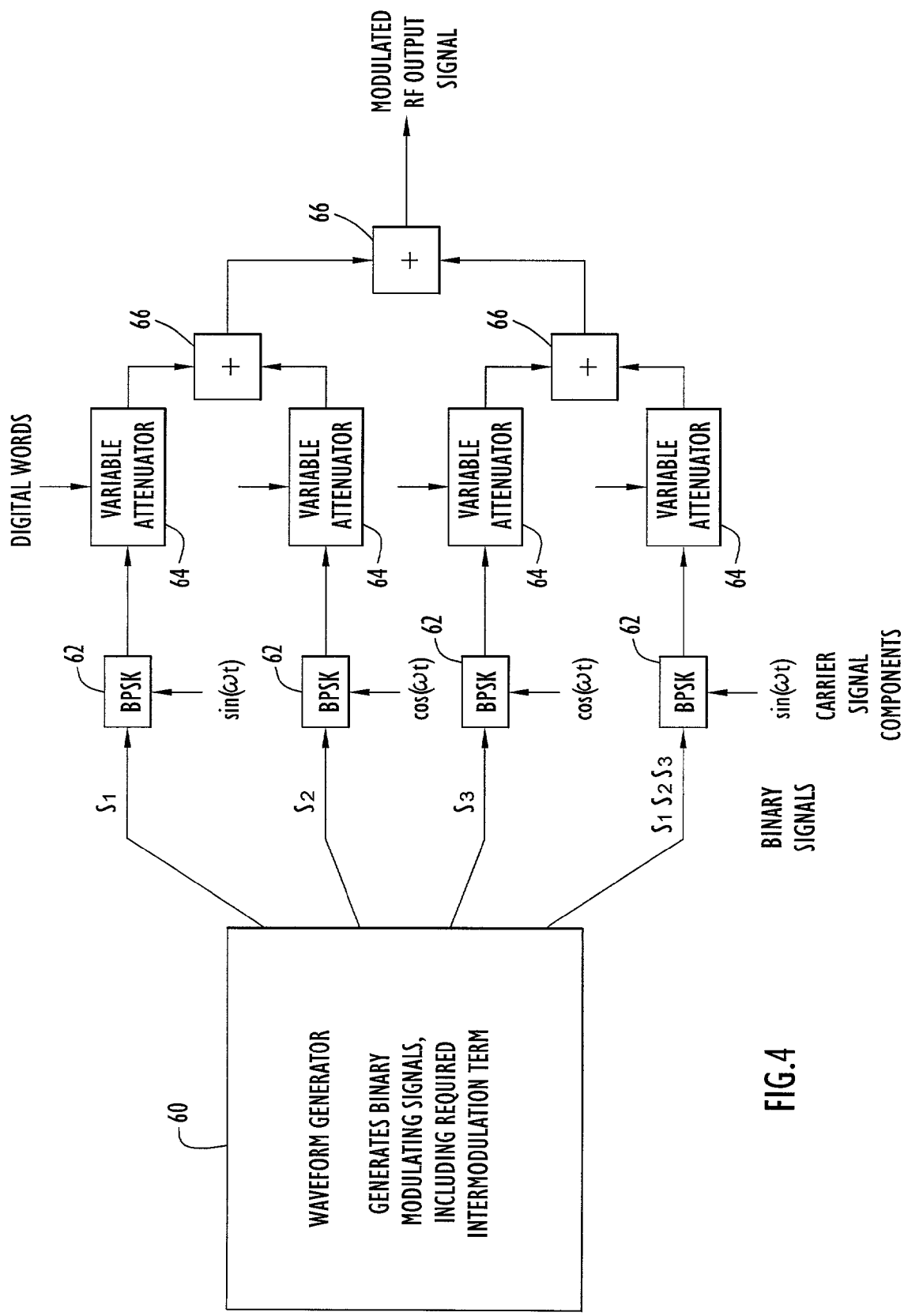
FIG. 4 is a schematic block diagram of an interplex modulator configuration useful for implementing the intervote modulation scheme of the exemplary embodiment of the present invention.

A programmable waveform generator capable of generating constant-envelope composite RF transmission signals, and suitable for use in the intervote modulation scheme of the present invention, is described in U.S. patent application Ser. No. 09/205,510 entitled "Programmable Waveform Generator for a Global Positioning System", filed Dec. 4, 1998, now U.S. Pat. No. 6,335,951, the disclosure of which is incorporated herein by reference in its entirety. This waveform generator essentially implements an interplex modulator in accordance with the four mathematical terms that comprise equation (2). Specifically, as shown in FIG. 4, the three signal components $s_1$, $s_2$, and $s_3$ and the required intermodulation product $s_1s_2s_3$ are generated individually by a waveform generator 60 and respectively supplied as binary signals to four separate binary phase shift key (BPSK) modulators 62 where these binary signals are used to directly modulate the RF carrier in-phase and quadrature components. In particular, in accordance with equation (2), a first BPSK modulator modulates the quadrature component of the carrier Sin($\omega t$) with the binary signal $s_1$, a second BPSK modulator modulates the in-phase component of the carrier Cos($\omega t$) with the binary signal $s_2$, a third BPSK modulator modulates the in-phase component of the carrier Cos($\omega t$) with the binary signal $s_3$, and a fourth BPSK modulator modulates the quadrature component of the carrier Sin($\omega t$) with the intermodulation product $s_1s_2s_3$.

The outputs of the four modulators are then respectively supplied to four variable attenuators 64 which respectively attenuate the four modulated signals by the four values $\mathrm{Cos}(\beta_1)\mathrm{Cos}(\beta_2)$, $\mathrm{Sin}(\beta_1)\mathrm{Cos}(\beta_2)$, $\mathrm{Cos}(\beta_1)\mathrm{Sin}(\beta_2)$ and $\mathrm{Sin}(\beta_1)\mathrm{Sin}(\beta_2)$ to achieve the desired relative power ratios among the four signal components. The constant-envelope composite signal (i.e., the modulated RF output signal) is then formed by summing the four attenuated, modulated carrier components via combiners 66.

The approach taken in the interplex modulation shown in FIG. 4 eliminates a number of limitations of conventional interplex modulators in generating a constant-envelope composite signal. In particular, the modulating signal has a much lower frequency content than the modulated intermediate frequency signal in a conventional interplex modulator, thereby avoiding harmonic interference in the resultant composite signal. The modulating signals from the waveform generator are clocked binary signals that are sent directly to the modulators, thereby eliminating the D/A converter and any associated jitter and phase noise. Further, because no up-conversion of the modulated signal is required, no amplitude variation is introduced by bandpass filters. While the interplex modulation configuration shown in FIG. 4 is suitable for use in the intervote modulation system of the present invention, it will be understood that the invention is not limited to any particular implementation of the interplex modulator, and any of a variety of interplex modulation configurations can be employed.

In the exemplary embodiment of present invention, the task of the majority voting logic unit 14 is to map the five input signal codes to the three interplex modulator input signals in a manner that will allow the interplex modulator to produce a constant-envelope composite signal with very good power efficiency. Conceptually, there are three aspects to this task. First, it must be determined which one of the three interplex modulator inputs $s_1$, $s_2$ and $s_3$ will receive the composite majority vote signal (and, equivalently, which two of the interplex modulator inputs will receive the uncombined, individual signal codes). Second, it must be determined which three of the five input signal codes will be combined to form the composite majority vote signal (and, equivalently, which two of the five input signal codes will remain individual, uncombined signal codes). Third, the actual majority voting decision logic used to combine the three signals must be determined.

Because the transmitted output signal cannot perfectly represent the multiple input signals combined by majority voting, the majority voting logic attempts to minimize the resulting loss in effective power experienced in a receiver detecting one of the original input signals when that receiver correlates the received signal with a time-aligned replica of its assigned CDMA code. The multiplexing loss is the same for each user signal combined via majority logic, preventing any one signal from suffering excessive effective power loss at the expense of the others. Prior to describing the decision logic employed by the majority vote logic of the exemplary embodiment, a brief description of majority vote (MV) and generalized majority vote (GMV) logic is warranted.

In the context of electronic signal combining, the connotation of term "majority vote" is similar to that in the familiar and commonplace contexts from which the term is borrowed. Specifically, when a committee consisting of an odd number of people votes "yea" or "nay" on a matter, the vote is resolved according whether the greater number of votes is cast for yea or nay. This process may be modeled mathematically by assigning a value of +1 to "yea" and −1 to "nay," denoting the n-th vote (which takes on value ±1) by $v_n$, and creating the summed vote, $$\sum_{n=1}^{N} v_n, \quad (3)$$

where N denotes the number of voters (assumed to be an odd number). The decision rule applied to the sum is $$\sum_{n=1}^{N} v_n \begin{cases} > 0; \text{ yea} \\ < 0; \text{ nay} \end{cases} \quad (4)$$

Similar to its use in an electoral process, majority voting can be used in electronic systems to create a representation of the dominant element in a set of binary data (±1 s). Table 1 below illustrates all possible majority vote outcomes for a voting population of three binary codes. Notice that the majority vote matches any one of the three codes in six of the eight cases.

TABLE 1

Majority outcomes for the votes of three voters.

| Code 1 | + | + | + | + | − | − | − | − |
| Code 2 | + | + | − | − | + | + | − | − |
| Code 3 | + | − | + | − | + | − | + | − |
| Majority | + | + | + | − | + | − | − | − |

In democratic systems, it is normally undesirable to give weighted preference to any individual vote. However, in electronic systems, it is often necessary to combine multiple signals whose power levels differ and which levels are to be preserved in the combination. Such a combination cannot be achieved without some form of weighted preference. Pure majority vote logic cannot factor weighted preferences into the decision logic. However, an extension of majority vote logic, called generalized majority vote (GMV) logic, can do so.

To understand generalized majority vote, consider a voting process in which a population of ninety-nine voters votes on a binary proposition, but in which unequal consideration is given to individual votes in order to determine the outcome. In this example, three separate tallies are formed. The first of these tallies employs conventional counting of all ninety-nine votes, resulting in a tally=±1, according to whether the yeas or nays have a greater count. In the second tally, however, only the votes of voters numbered one through sixty-six (1–66) are counted and subjected to majority rule in reaching another ±1 tally, neglecting the remaining voters, numbered sixty-seven through ninety-nine (67–99). Similarly, the third tally is produced based on the votes of the last two-thirds of the voters, numbered voters thirty-four through ninety-nine (34–99). A final decision is reached by computing the majority vote of the three preliminary tallies.

In this process, the middle third of the voters (34–66) is represented in all three tallies, while the votes of the remainder of the voters affect only two of the three tallies. It is evident that the middle third of the voters has greater influence on the final outcome than the other voters have.

If this same method is applied to a large number of consecutive votes on distinct issues, issues for which the popular vote is generally divided close to 50/50, each voter will find his interests served some fraction of the time. For the middle group, that fraction will exceed 50%, but for the others it will not.

This technique may be applied to communication signals to give weighted emphasis to a certain third (e.g., 33 of 99) user signals that are multiplexed by the voting mechanism. If each voted element were to represent a distinct bit of data, there would be a huge loss of fidelity in each time reducing the 99 bits to a single one. However, in a direct sequence, pseudo-noise (PN) spread spectrum system, where the "voting element" can be one binary chip of a user-unique spread spectrum sequence, the averaging effect noted above occurs across all chips belonging to a specific bit interval, permitting each user to receive a signal in which his data bit is represented with a predetermined fidelity. This is true because majority voting is applied on a chip-by-chip basis, and there are generally a significant number of chips per each bit of information. Although individual chips of the combined signal will be incorrect relative to some of the corresponding chips of each of the original constituent chip sequences, over the span of an entire bit, most of the chips of the combined signal will accurately reflect the corresponding chips of each of the original sequences, allowing the information bit to be detected and correctly determined by a receiver with only a modest degree of signal degradation. Since communication signals are received in the presence of noise and other transmission anomalies, application of majority voting amounts to imposing a measure of power control over the various multiplexed PN codes (i.e., the input signals to be combined).

In order to decrease the effective power allocated to a given PN code, that code is omitted from a certain number of the majority votes that occur per bit (this is called a "sub-majority vote"). The entire collection of such techniques constitutes generalized majority vote (GMV) multiplexing. Clearly, there are many ways this GMV can be accomplished, involving various sub-majority votes in which certain codes do not participate. Among these, one (or more) ways to allocate the codes to the multiplex is most efficient in the sense that the sum of the effective powers given to the codes is maximized. For any desired power distribution, a maximally efficient solution is always desired.

In combining three PN signal codes, as in the example in the exemplary embodiment, there are but four possible elements to combine: the majority vote of the three chips and the three individual (or "solo") chips themselves. Mathematical analysis demonstrates that if one code's allocated power is smaller than that of the other two, transmission of solo chips from that code never results in the most efficient solution from a power standpoint, removing that element from the solution space. Further analysis demonstrates that if the targeted power distribution is in proportion to the gains $\{G_1, G_2, G_3\}$, where the gains are listed in non-decreasing order, then the majority vote and the solo chips of the two larger codes should be transmitted the following fractions of the time:

$$f_{MV} = \frac{2}{\sqrt{G_2} + \sqrt{G_3}}$$

$$f_2 = \frac{\sqrt{G_2} - 1}{\sqrt{G_2} + \sqrt{G_3}}$$

$$f_3 = \frac{\sqrt{G_3} - 1}{\sqrt{G_2} + \sqrt{G_3}}$$

(5)

The three fractions in equation (5) sum to unity. For example, for a gain distribution $\{G_1, G_2, G_3\} = \{1,4,9\}$, the fraction-of-time values become:

$$\{f_{MV}, f_2, f_3\} = \left\{\frac{2}{5}, \frac{1}{5}, \frac{2}{5}\right\}.$$

In this example, if there are 100 chips per bit, 40 of the 100 chips are devoted to the largest code (i.e., the value of 40 of the output chips is the value of the highest gain code, irrespective of the value of the other two codes); 20 of the 100 chips have the value of the second largest code irrespective of the value of the other two codes, and 40 of the 100 output chips are determined in accordance with a true majority vote of the chips of the three codes. By interlacing the majority vote signal and solo signals in accordance with the fractions given in equation (5), the power loss caused by combining the signals is distributed uniformly over the three original signals, such that each signal will suffer the same percentage loss of power.

The efficiency of the three-code multiplex, i.e., the fraction of transmitted power that ends up as code power, is $$\eta = \frac{G_1 + G_2 + G_3}{\left(\sqrt{G_2} + \sqrt{G_3}\right)^2}.$$

(6)

The numerical efficiency $\eta$ given in equation (6) lies between 0 and 1 and may be expressed as a percentage by multiplying the right-hand side of (6) by 100. Thus, the effective transmitted power of each of signal will be $\eta$ times the target power of the signal for each of the three signals (e.g., if $\eta$ is 0.9, each of the three signals will suffer a ten percent effective power loss relative to their respective target gains).

The fractions in equation (5) are preferably interpreted deterministically, i.e., as applying on a per-chip basis. A probabilistic implementation is also possible, where the fractions represent averages over many bits, but this implementation engenders loss of efficiency due to induced variations in the achieved power distribution from bit to bit.

In the three-code case, the solution for the time fractions is unique. That is, because there are actually two input parameters (two of the three gains, since the result is ratio-invariant) and two free variables to calculate (two of the three fractions, since their sum is constrained to equal unity). These circumstances generate two equations and two unknowns that may be uniquely solved.

When there are more than three signals to be combined by generalized majority vote, multiple solutions arise from which one can select the most efficient. In the five-code case, for example, there are four inputs (gain ratios), but a much greater number of fraction-of-time variables. The components from which the GMV multiplex may be constructed consist of: the five-way majority vote; 10 three-way vote combinations; four solo chips (again, solo chips of the weakest code are not used); and five possible four-way votes in which one of the codes is allocated two votes, the remainder having one each. This totals to 20 elements, or 19 free variables. There results four equation in 19 unknowns, for which multiple solutions may exist. As the number of codes participating in the multiplex increases, the number of possible solutions grows rapidly. Often, the most efficient multiplex can be discovered only by a search technique.

From the efficiency given in equation (6), it can be determined what power distributions are favorable or unfavorable to consider from an efficiency standpoint in the three-code case. When the power in one code is much larger than that of either of the other two, the multiplex efficiency approaches 100%. However, in the case of two large codes and one small one, the efficiency is about 50%, i.e., half the transmitted power is effectively wasted. When the three codes are equal in power, the efficiency is 75%. Similar behaviors are found when the number of codes being multiplexed is larger. The presence of a few large codes causes those to monopolize the multiplex, at a price in efficiency. In general, multiplex efficiency is enhanced when the sub-majority vote components contain larger, rather than smaller, numbers of codes.

The GMV multiplex can be implemented using an algorithm in which a weighted sum of the instantaneous chip values is computed at each chip time (it is assumed that the chips are time synchronous and occur at a common chip rate), following which the algebraic sign of the sum is computed as $\pm 1$. Denoting by $\{c_n(k)\}$ the instantaneous set of chip values, $1 \leq n \leq N$, at time k, and by $\{w_n(k)\}$ the corresponding set of weighting factors, the GMV output chip, C(k), is computed as $$C(k) = sgn\left(\sum_{n=1}^{N} w_n(k)c_n(k)\right) \quad (7)$$

Figure 5:
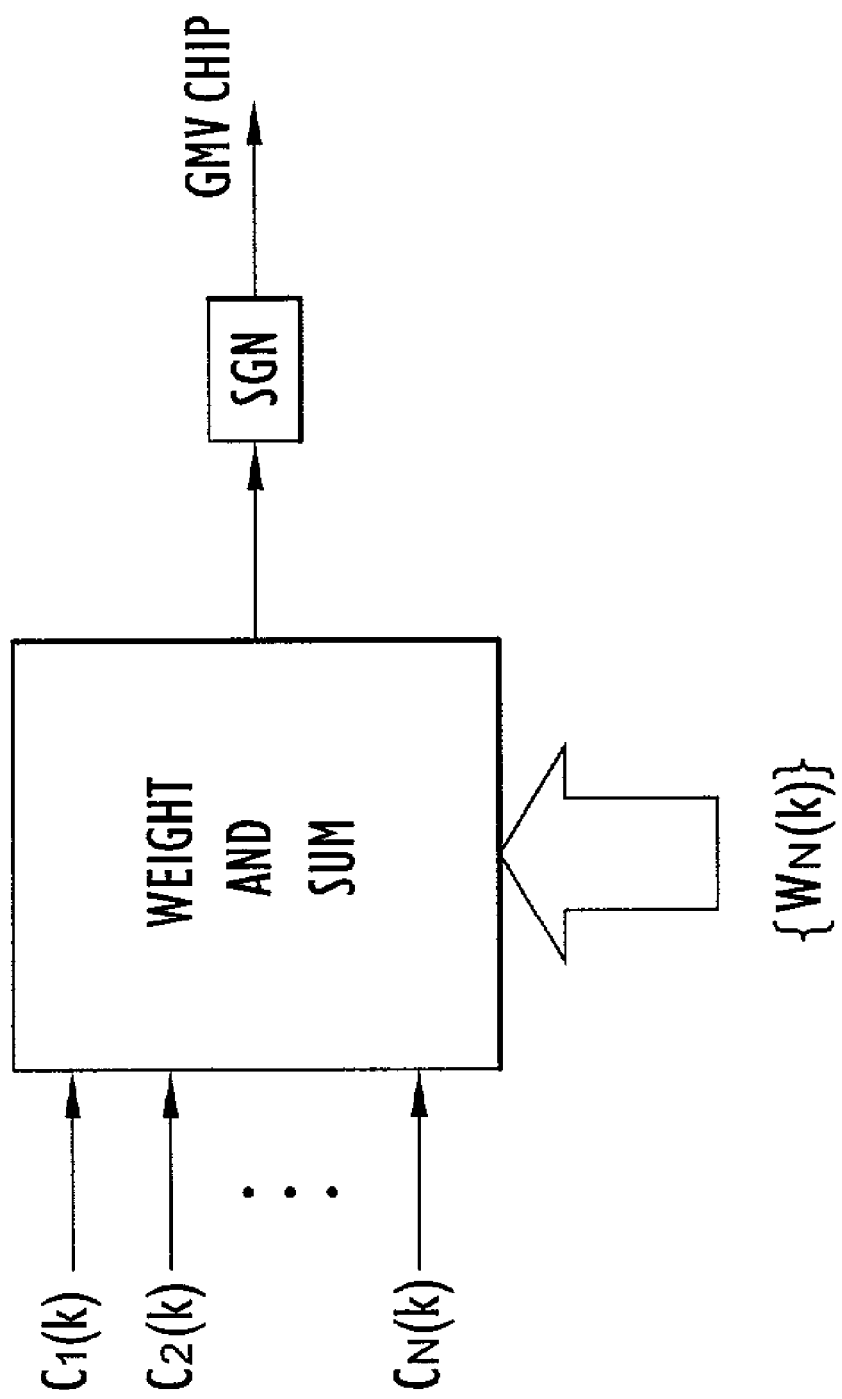
FIG. 5 is a diagrammatic illustration of a generalized majority voting processor performing an interlaced, sub-majority voting scheme by applying weighting factors to each input signal on a chip-by-chip basis.

For a sub-majority vote, the $\{w_n(k)\}$ take on values of 0 or 1. Other values of $w_n(k)$ are possible, however. For example, in a four-code case, one could allocate two votes to a single code and one each to the remaining three; one of the weights would then equal two. This gives an assured advantage but not a guaranteed outcome to the code having two votes. The instantaneous values of the $\{w_n(k)\}$ must always be such that the summation in equation (7) never results in a zero value. FIG. 5 illustrates a block diagram of a GMV processor, operating as described above. As used herein and in the claims, unless indicated otherwise, the terms "majority vote", "majority voting", "majority voting logic", etc. include both true majority vote and the aforementioned generalized majority vote.

In the context of the intervote modulation scheme of the present invention, it is not always the case that the most efficient GMV solutions make the best components to insert into the interplex modulator to achieve the best overall efficiency. For this reason the search algorithm that computes the efficiency over a small number of trial solutions is required to optimize the intervote multiplex.

Intervote modulation can be also constructed beginning with an interplex structure that accommodates more than three signals. However, it has been shown that interplex modulation efficiency tends to decrease as the number of component signals increases. Consequently, in the five signal example described herein, it is preferable to aggregate the input signals into three signals using GMV methods and to subsequently interplex modulate these three signals, especially when the commanded power distribution can change during operation. Under a fixed power distribution, however, a larger interplex modulator (e.g., with five inputs) might prove advantageous in some cases.

Figure 6:
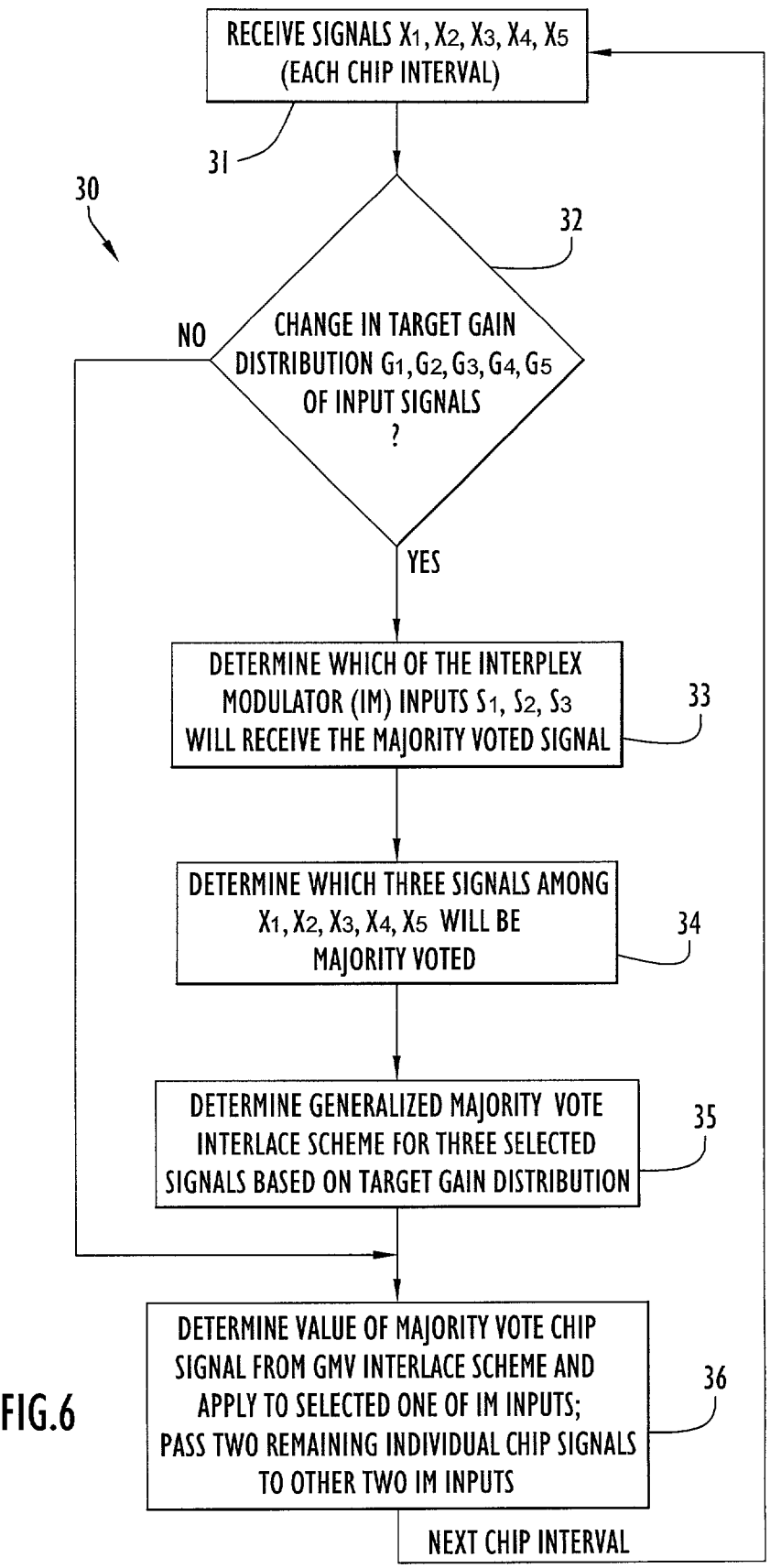
FIG. 6 is a functional flow diagram illustrating conceptually the operations performed by the majority voting logic unit of the exemplary embodiment to generate the interplex modulator input signals.

A specific implementation for determining which three of the five input signals should be combined by majority vote logic in the intervote modulation scheme of the present invention will now be described. Referring to FIG. 6, at each chip interval the majority voting logic unit receives binary values for five signal codes $x_1$, $x_2$, $x_3$, $x_4$, $x_5$ (step 31). Each time there is a change in the target gains $G_1$, $G_2$, $G_3$, $G_4$, $G_5$, the majority voting logic unit must re-determine how the five input signal codes are to be mapped to the three interplex modulator inputs $s_1$, $s_2$ and $s_3$ during the ensuing period in which those target gains are in effect (i.e., over a significant number of chip intervals). Conceptually, the determinations to be made by the majority voting logic unit are represented in FIG. 6 by steps 33, 34 and 35. Specifically, the majority voting logic unit must determine which of the interplex modulator inputs $s_1$, $s_2$ and $s_3$ will receive the majority-voted composite signal and which two of the interplex modulator inputs will receive individual signal codes (step 33). The majority voting logic unit must also determine which three of the five signal codes $x_1$, $s_2$, $x_3$, $x_4$, $x_5$ are to be majority voted and which two signal codes will remain as individual signals (step 34). While these two decisions are represented separately in FIG. 6, in practice, these decisions are interrelated and can both be determined by performing a search algorithm to find an efficient solution, as will be explained below. Finally, in step 35, the majority voting logic unit must determine the generalized majority vote interlace scheme for the three selected signals as a function of the target gains of the three signals. This step can be accomplished by implementing a sub-majority vote interlace scheme in accordance with the fractions given in equation (5).

Once the majority voting scheme has been determined for the gain interval, the majority voting logic unit proceeds to apply the logic to the current set of chip values. Specifically, the majority voting logic unit determines the value of the majority vote composite signal from the determined GMV interlace scheme and applies the majority vote composite signal to the selected one of the interplex modulator inputs while passing the remaining two individual signal codes to the other two interplex modulator inputs (step 36). The majority voting logic unit then proceeds to processes the signal code values for the next chip interval. As indicated in step 32, if there is no change in the target gain distribution from the previous chip interval, step 36 is carried out with the majority voting logic previously determined for the current constant-gain time interval.

The methodology for determining a majority vote that is efficient in the intervote modulator of the present invention is now described. Again, the majority voting logic is responsible for combining three of the signals, and the interplex modulator receives three signals: the combined signal and the remaining two uncombined signal. Thus, one of the three signals is an interlaced majority vote of three codes and the other two signals represent one individual code each. Three-signal interplex is defined by the equations $$I = \frac{K_1 s_1 - \sqrt{K_2}\, s_1 s_2 s_3}{\sqrt{(K_1+1)(K_1+K_2)}} \quad (8)$$

$$Q = \frac{\sqrt{K_1 K_2}\, s_2 + \sqrt{K_1}\, s_3}{\sqrt{(K_1+1)(K_1+K_2)}}$$

where $s_1$, $s_2$ and $s_3$ are the input interplex components and $K_1$ and $K_2$ are gain constants that are determined by the desired gain distribution and the placement of the majority vote. Let $\{x_1, x_2, x_3, x_4, x_5\}$ be the five codes with target gain distribution $\{G_1, G_2, G_3, G_4, G_5\}$. For the methodology described here, it is important to give the gains in non-decreasing order, i.e. $G_{n+1} \geq G_n$. No particular normalization is required.

In order to find the best efficiency, it is in principle necessary to test all permutations of the five codes and all locations of the majority vote. There are three logical possibilities for the majority vote placement: $s_1$, $s_2$ or $s_3$. In this example, the interplex modulator forms the in-phase (I) component from signal $s_1$ and an intermodulation term involving $s_1$, $s_2$ and $s_3$, and forms the quadrature (Q) component from signals $s_2$ and $s_3$. Thus, in this scheme, there is no distinction between the $s_2$ and $s_3$ placements, reducing the placement options to two cases, described as "Majority Vote on I" and "Majority Vote on Q," respectively. In the latter case the default majority vote position is taken to be $s_2$.

Let $\{y_1, y_2, y_3, y_4, y_5\}$ be some permutation of the x's. An example would be $$\{y_1, y_2, y_3, y_4, y_5\} = \{x_2, x_3, x_4, x_1, x_5\} \quad (9)$$

There are 5!=120 order-distinct permutations of five objects, and three places to put the majority vote, or 360 possibilities. However, in this problem, there are symmetries that make the actual number of distinct cases much smaller. It turns out that the number of efficiency evaluations required is only 30, and not 360, as it initially appeared.

In the first case, majority vote on I, the transmitted signals are assigned as follows for a given permutation:

$$s_1 = \{M(y_1, y_2, y_3), y_2, y_3\}$$

$$s_2 = y_4 \quad (10)$$

$$s_3 = y_5$$

The notation for $s_1$ indicates that it is an interlace of the majority vote of $y_1$, $y_2$ and $y_3$ with solo chips of $y_2$ and $y_3$ in accordance with the generalized majority voting logic described above. The three instantaneous possibilities for $s_1$ occur with relative frequencies selected to achieve a target gain distribution among $y_1$, $y_2$ and $y_3$. One of the restrictions on the applicable permutations is inherent in equation (9), i.e., that the only permutations that need be used are those for which the gain of $y_1$ is less than or equal to the gain of each of the other two majority-voted components.

In the second case, majority vote on Q, the transmitted signals are assigned as follows for a given permutation:

$$s_1 = y_4$$

$$s_2 = \{M(y_1, y_2, y_3), y_2, y_3\} \quad (11)$$

$$s_3 y_5$$

Let the gains associated with a permutation be denoted $\{g_1, g_2, g_3, g_4, g_5\}$. For the permutation example given in (9) these are $$\{g_1, g_2, g_3, g_4, g_5\} = \{G_1, G_2, G_3, G_4, G_5\} \quad (12)$$

The efficiencies for the two majority vote placements under this permutation follow. For the majority vote on I (i.e., on $s_1$):

$$\eta_I = \frac{\left(\sqrt{g_2} + \sqrt{g_3}\right)^2 (g_1 + g_2 + g_3 + g_4 + g_5)}{\left[\left(\sqrt{g_2} + \sqrt{g_3}\right)^2 + g_4\right]\left[\left(\sqrt{g_2} + \sqrt{g_3}\right)^2 + g_5\right]} \quad (13)$$

For the majority vote on Q (i.e., on $s_2$)

$$\eta_Q = \frac{g_4(g_1 + g_2 + g_3 + g_4 + g_5)}{\left[\left(\sqrt{g_2} + \sqrt{g_3}\right)^2 + g_4\right](g_4 + g_5)} \quad (14)$$

Each permutation requires its own set of interplex parameters $K_1$ and $K_2$. For majority vote on I:

$$K_1 = \frac{\left(\sqrt{g_2} + \sqrt{g_3}\right)^2}{g_5}; \quad K_2 = \frac{g_4}{g_5} \quad (15)$$

For majority vote on Q:

$$K_1 = \frac{g_4}{g_5}; \quad K_2 = \frac{\left(\sqrt{g_2} + \sqrt{g_3}\right)^2}{g_5} \quad (16)$$

To complete the calculation, it is necessary both to evaluate equations (13) and (14) for the following ten permutations and to select the case that gives the largest efficiency:

$$\{g_1, g_2, g_3, g_4, g_5\} = \{G_1, G_2, G_3, G_4, G_5\}$$

$$= \{G_1, G_2, G_4, G_3, G_5\}$$

$$= \{G_1, G_2, G_5, G_3, G_4\}$$

$$= \{G_1, G_3, G_4, G_2, G_5\}$$

$$= \{G_1, G_3, G_5, G_2, G_4\}$$

$$= \{G_1, G_4, G_5, G_2, G_3\}$$

$$= \{G_2, G_3, G_4, G_1, G_5\}$$

$$= \{G_2, G_3, G_5, G_1, G_4\}$$

$$= \{G_2, G_4, G_5, G_1, G_3\}$$

$$= \{G_3, G_4, G_5, G_1, G_2\} \quad (17)$$

These permutations are in what can be called "standard" order. Observe that the indices are increasing in positions 1, 2 and 3. This assures that the smallest gain component of the majority vote will never be transmitted as a solo chip. The order of the codes in positions 2 and 3 is immaterial, as the efficiency formulas (13) and (14) show, and thus the standard order covers all cases.

The situation is different for positions 4 and 5. Order is significant because one of the signals is supplied to I (i.e., it become $s_1$) and the other on Q (i.e., it becomes $s_3$). For this case, there are twenty permutations to evaluate: the ten given in equation (17) plus another ten with the last two positions interchanged. Therefore, the minimum power loss can be found by checking a total of thirty cases, rather than the three-hundred and sixty cases that would occur in an exhaustive evaluation.

Having selected which of the three signals to combine by majority voting and having selected the assignment of the combined signal and the two remaining original signals to $s_1$, $s_2$ and $s_3$, the interplex modulator operates on signals $s_1$, $s_2$ and $s_3$ to form the I and Q components of the constant envelope signal. The majority vote of the three selected signal codes is performed in accordance with a GMV scheme of interlaced majority vote and sub-majority vote chips. In particular, the interlace is carried out in accordance with the fractions set forth in equation (5). Although the embodiment described herein involves forming the I component from signal $s_1$ and an intermodulation term and forming the quadrature (Q) component from signals $s_2$ and $s_3$, it will be understood that virtually any interplex modulation scheme can be employed in the intervote modulation scheme of the present invention, provided that the majority voting logic accounts for the interplex modulation scheme in determining which signals to combine. While the interplex implementation described in the exemplary embodiment employs BPSK modulation to perform phase modulation and variable attenuators to perform amplitude modulation of the carrier components, it will be appreciated that the invention is not limited to this modulation scheme, and the invention can be implemented using any phase shifted keyed modulation, including but not limited to quadrature phase shift keying, 8-PSK, 16-PSK, etc. Likewise, the RF carrier components can be modulated with any feasible number of discrete amplitude states via any suitable attenuator or gain devices.

While foregoing example involves five signals in which three signals are combined by generalized majority vote and three inputs are supplied to the interplex modulator, it should be understood that the invention is not limited to this particular configuration, and the principles of the invention can be extended to any number of total signals and interplex modulator inputs.

It will be appreciated that the intervote modulation scheme of the present invention overcomes the limitations typically found when using majority voting or interplex modulation alone. In the case of majority voting, the small signal suppression problem can be avoided in most instances, because only a subset of the signal are combined, and the majority voting logic can determine which combination of signals is most efficient (in conventional majority voting, such options do not exist, since the majority voting logic must combine all signals). Likewise, interplex modulation becomes increasingly inefficient as the number of signals increases. The present invention avoids such inefficiencies by reducing the number of signals that the interplex modulator must combine (e.g., in the described embodiment, the number is reduced from five to three).

Intervote modulation is applicable for a wide range of diverse applications that require simultaneous transmission of multiple signals, including future generations of the Global Positioning System (GPS), cellular telephony, satellite communication systems, GPS augmentation systems, the Global Multi-Mission Service Platform (GMSP), systems employing code division multiple access (CDMA) multiplexing and many others.

Preferably, the intervote modulator of the present invention is implemented in a programmable waveform generator of a transmitter system. Such an implementation allows remote programmability of the modulation characteristics of units in the field, such as satellites in orbit, communications infrastructure, and mobile communication devices, including wireless telephones. The capability to reprogram the waveform generator is especially valuable in the space satellite context, where changes in required modulation can take many years and a new satellite design to accomplish. With the reprogrammable waveform generator of the present invention on board, a satellite can be reprogrammed in orbit. In general, the majority voting logic unit and the interplex modulator can be implemented using any suitable combination of hardware and software.

Having described preferred embodiments of a new and improved method and apparatus for generating constant-envelope composite transmission signals, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of combining a plurality of at least five signals to form a constant-envelope composite signal for transmission, comprising:
   (a) combining a subset of at least three of the plurality of at least five signals by majority vote to form a majority voted signal; and
   (b) interplex modulating the majority voted signal and others of the plurality of signals to form the constant-envelope composite signal.

2. The method of claim 1, wherein (a) includes:
   (a1) determining which of the plurality of signals is in the subset to be majority voted and which of a plurality of interplex modulator inputs receives the majority voted signal as a function of a desired power distribution among the plurality of signals; and
   (a2) determining a majority voting logic for combining the subset of the plurality of signals as a function of the desired power distribution among the subset of the plurality of signals.

3. The method of claim 2, wherein (a1) and (a2) are performed when the desired power distribution changes.

4. The method of claim 1, wherein (a) includes combining the subset of the plurality of signals in accordance with a generalized majority vote scheme.

5. The method of claim 4, wherein the generalized majority vote scheme includes determining a sequence of values of the majority voted signal by interlacing values determined from a majority vote of signals in the subset with values determined from sub-majority votes of less than all of the signals in the subset.

6. The method of claim 5, wherein values of individual signals in the subset are interlaced with values of a majority vote of the signals in the subset.

7. The method of claim 1, wherein the plurality of signals comprises chip-synchronous, pseudo-noise signal codes, and wherein values of the majority voted signal are determined on a chip-by-chip basis.

8. The method of claim 1, wherein each of the plurality of signals is transmitted with a common power efficiency.

9. The method of claim 1, wherein a multiplexing loss resulting from combining the plurality of signals is substantially the same for each of the plurality of signals.

10. The method of claim 1, wherein (b) includes:
   receiving as interplex input signals the majority voted signal and the others of the plurality of signals;
   using the interplex input signals to phase modulate in-phase and quadrature components of a carrier signal;
   scaling the in-phase and quadrature components to establish a predetermined power ratio among the interplex input signals; and
   combining the in-phase and quadrature components to form the constant-envelope composite signal.

11. The method of claim 10, wherein (b) includes modulating the in-phase and quadrature components via phase shift keying.

12. The method of claim 1, wherein at least some of the plurality of signals contain global positioning information.

13. The method of claim 1, wherein the plurality of signals comprise code division multiple access signals.

14. An apparatus for combining a plurality of at least five signals to form a constant-envelope composite signal for transmission, comprising:
   a majority voting logic unit configured to combine a subset of at least three of the plurality of at least five signals by majority vote to form a majority voted signal; and
   an interplex modulator configured to combine the majority voted signal and others of the plurality of signals to form the constant-envelope composite signal.

15. The apparatus of claim 14, wherein said majority voting logic unit determines which of the plurality of signals is in the subset to be majority voted and which of a plurality of interplex modulator inputs receives the majority voted signal as a function of a desired power distribution among the plurality of signals, said majority voting logic unit further determining majority voting logic for combining the subset of the plurality of signals as a function of the desired power distribution among the subset of signals.

16. The apparatus of claim 15, wherein said majority voting logic unit determines which of the plurality of signals is in the subset to be majority voted, determines which of the plurality of interplex modulator inputs receives the majority voted signal, and determines majority voting logic for combining the subset of the plurality of signals when the desired power distribution changes.

17. The apparatus of claim 14, wherein said majority voting logic unit combines the subset of signals in accordance with a generalized majority vote scheme.

18. The apparatus of claim 17, wherein said majority voting logic unit determines a sequence of values of the majority voted signal by interlacing values determined from a majority vote of signals in the subset with values determined from sub-majority votes of less than all of the signals in the subset.

19. The apparatus of claim 18, wherein said majority voting logic unit interlaces values of individual signals in the subset with values of a majority vote of the signals in the subset.

20. The apparatus of claim 14, wherein the plurality of signals comprises chip-synchronous, pseudo-noise signal codes, and wherein said majority voting logic unit determines values of the majority voted signal on a chip-by-chip basis.

21. The apparatus of claim 14, wherein each of the plurality of signals is represented in the constant-envelope composite signal with a common power efficiency.

22. The apparatus of claim 14, wherein a multiplexing loss resulting from combining the plurality of signals is substantially the same for each of the plurality of signals.

23. The apparatus of claim 14, wherein said interplex modulator comprises:
   a plurality of phase modulators configured to modulate in-phase and quadrature components of a carrier signal in accordance with interplex input signals received from said majority voting logic unit;
   a plurality of attenuators corresponding to the plurality of phase modulators, said attenuators scaling the in-phase and quadrature components to establish a predetermined power ratio among the interplex input signals; and
   a signal combiner configured to combine the in-phase and quadrature components to form the constant-envelope composite signal.

24. The apparatus of claim 23, wherein said phase modulators are one of binary phase shift keying modulators and quadrature phase shift keying modulators.

25. The apparatus of claim 14, wherein at least some of the plurality of signals contain global positioning information.

26. The apparatus of claim 14, wherein the plurality of signals comprise code division multiple access signals.

27. The apparatus of claim 14, wherein at least one of said majority voting logic unit and said interplex modulator is remotely programmable.

28. An apparatus for combining a plurality of at least five signals to form a constant-envelope composite signal for transmission, comprising:
   means for combining a subset of at least three of the plurality of at least five signals by majority vote to form a majority voted signal; and
   means for interplex modulating the majority voted signal and others of the plurality of signals to form the constant-envelope composite signal.

29. The apparatus of claim 28, wherein said means for combining includes:
   means for determining which of the plurality of signals is in the subset to be majority voted and which of a plurality of interplex modulator inputs receives the majority voted signal as a function of a desired power distribution among the plurality of signals; and
   means for determining majority voting logic for combining the subset of the plurality of signals as a function of the desired power distribution among the subset of signals.

30. The apparatus of claim 29, wherein said means for combining determines which of the plurality of signals is in the subset to be majority voted, determines which of the plurality of interplex modulator inputs receives the majority voted signal, and determines majority voting logic for combining the subset of the plurality of signals when the desired power distribution changes.

31. The apparatus of claim 28, wherein said means for combining combines the subset of signals in accordance with a generalized majority vote scheme.

32. The apparatus of claim 31, wherein said means for combining determines a sequence of values of the majority voted signal by interlacing values determined from a majority vote of signals in the subset with values determined from sub-majority votes of less than all of the signals in the subset.

33. The apparatus of claim 32, wherein said means for combining interlaces values of individual signals in the subset with values of a majority vote of the signals in the subset.

34. The apparatus of claim 28, wherein the plurality of signals comprises chip-synchronous, pseudo-noise signal codes, and wherein said means for combining determines values of the majority voted signal on a chip-by-chip basis.

35. The apparatus of claim 28, wherein each of the plurality of signals is represented in the constant-envelope composite signal with a common power efficiency.

36. The apparatus of claim 28, wherein a multiplexing loss resulting from combining the plurality of signals is substantially the same for each of the plurality of signals.

37. The apparatus of claim 28, wherein said means for interplex modulating comprises:
- means for phase modulating in-phase and quadrature components of a carrier signal in accordance with interplex input signals received from said means for combining;
- means for attenuating the in-phase and quadrature components to establish a predetermined power ratio among the interplex input signals; and
- means for combining the in-phase and quadrature components to form the constant envelope composite signal.

38. The apparatus of claim 37, wherein said means for phase modulating is one of binary phase shift keying modulators and quadrature phase shift keying modulators.

39. The apparatus of claim 28, wherein at least some of the plurality of signals contain global positioning information.

40. The apparatus of claim 28, wherein the plurality of signals comprise code division multiple access signals.

* * * * *